United States Patent
Suzuki et al.

(10) Patent No.: US 6,806,685 B2
(45) Date of Patent: Oct. 19, 2004

(54) ACCUMULATOR POWER SUPPLY UNIT

(75) Inventors: Makoto Suzuki, Chiba (JP); Takaya Sato, Chiba (JP)

(73) Assignee: Nisshinbo Ind. Inc., Tokyo (JP)

( * ) Notice: Subject to any disclaimer, the term of this patent is extended or adjusted under 35 U.S.C. 154(b) by 0 days.

(21) Appl. No.: 10/246,702

(22) Filed: Sep. 19, 2002

(65) Prior Publication Data
US 2003/0058667 A1 Mar. 27, 2003

(30) Foreign Application Priority Data
Sep. 25, 2001 (JP) ........................................ 2001-292274

(51) Int. Cl.$^7$ ................................................. H02J 7/08
(52) U.S. Cl. ........................ 320/116; 320/118; 320/120
(58) Field of Search ................................ 320/116, 117, 320/118, 119, 120

(56) References Cited

U.S. PATENT DOCUMENTS

| | | | |
|---|---|---|---|
| 5,003,244 A | | 3/1991 | Davis, Jr. |
| 5,412,305 A | * | 5/1995 | Jeanneret .................... 320/119 |
| 6,297,616 B1 | * | 10/2001 | Kubo et al. .................. 320/116 |
| 6,373,223 B1 | * | 4/2002 | Anza et al. .................. 323/282 |
| 6,441,583 B1 | * | 8/2002 | Perelle ........................ 320/119 |

FOREIGN PATENT DOCUMENTS

| | | |
|---|---|---|
| EP | 0 740 388 A | 10/1996 |
| EP | 0 749 191 A | 12/1996 |
| EP | 0 769 837 | 4/1997 |
| EP | 1 094 589 | 4/2001 |
| JP | 5336673 | 12/1993 |

* cited by examiner

*Primary Examiner*—Bao Q. Vu
(74) *Attorney, Agent, or Firm*—Apex Juris, pllc; Tracy M Heims

(57) ABSTRACT

An accumulator power supply unit equalizing the voltage between terminals of the respective accumulator block to be a predetermined value without being affected by different characteristics of the accumulator block such as electric double layer capacitor and secondary battery in series or serial-parallel connection. The accumulator power supply unit comprises plural accumulator blocks in a series connection or a serial-parallel connection and plural transform charging circuits connected in parallel to the respective accumulator block, wherein the respective accumulator block is independently charged by the transform charging circuit and a control method for the same.

4 Claims, 2 Drawing Sheets

ACCUMULATOR POWER SUPPLY UNIT

BACKGROUND OF INVENTION

1. Field of the Invention

This invention relates to an accumulator power supply unit which independently controls the charging of the respective accumulator block, comprising electrical double layer capacitors and secondary batteries connected in series or in series-parallel and supplies a DC power to electrical parts connected outside of the accumulator power supply unit.

2. Description of Prior Art

Traditionally, when plural electric double layer capacitors connected in series are charged, charging voltage is supplied in series to charge all double layer capacitors simultaneously so as to equalize the charging voltage of the respective capacitor.

However, since characteristic of the capacitors is not uniform and a state of charge of the respective capacitors varies, the traditional series charging method causes increased irregularity in the charging voltage of the respective capacitor and generates a portion that exceeds the withstand voltage of the capacitors. Capacitors that exceed the withstand voltage due to the overcharge have a problem in that a decomposition of the electrolyte is accelerated resulting in deterioration of the capacitor performance and durability.

In order to avoid overcharging the respective capacitor exceeding the withstand voltage, the voltage across the respective capacitor is detected for the purpose of bypassing the electric current at an overcharged portion of the respective capacitor, thereby equalizing the charging voltage across each of the capacitors.

For that reason, the traditional charging method requires an electric current bypass circuit for actually bypassing the electric current with possible overcharge.

However, the above structure causes a problem of power loss in the electric current bypass circuit leaving some portions ineffectively consuming electricity.

SUMMARY AND OBJECT OF THE INVENTION

An object of this invention is to provide an accumulator power supply unit technology which does not require an electric current bypass circuit and does not cause a problem of unnecessary power loss when charging an accumulator block such as electric double layer capacitors and secondary batteries are connected in series or in series-parallel. Further, another object of this invention to provide an accumulator power supply unit technology which equalizes the voltage of the respective accumulator block regardless of the different increasing speed of the charging voltage due to different characteristic of the respective accumulator block.

Another object of this invention is to provide an accumulator power supply unit technology in which a combination of electric double layer capacitors and secondary batteries may be used for an accumulator block in series or series-parallel connection as shown in a circuit structure of FIG. 2 in this invention, thereby enabling to independently set the charging electric current and the charging voltage for charging the respective accumulator block Another object of this invention is to provide an accumulator power supply unit technology which efficiently charges an accumulator block such as electric double layer capacitors and secondary batteries in series or series-parallel connection.

Another object of this invention is to provide an accumulator power supply unit technology which only charges the specific accumulator block in need of charging without affecting the charge of other accumulator blocks when charging an accumulator block such as electric double layer capacitors and secondary batteries in series or series-parallel connection.

In order to resolve the above problems, this invention provides an accumulator power supply unit, comprising plural accumulator blocks in a series connection or a series-parallel connection and plural transform charging circuits connected in parallel with the respective accumulator block, wherein the respective accumulator block is independently charged by the transform charging circuit. Further this invention provides a method for controlling the charge of an accumulator power supply unit, comprising steps of connecting accumulator blocks in series or series-parallel manner, connecting transform charging circuits in parallel to the respective accumulator block, and charging the respective accumulator block independently by the transform charging circuit.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF THE PREFERRED EMBODIMENTS

The embodiments of the invention are next described while referring to the accompanying drawings.

Figure 1:
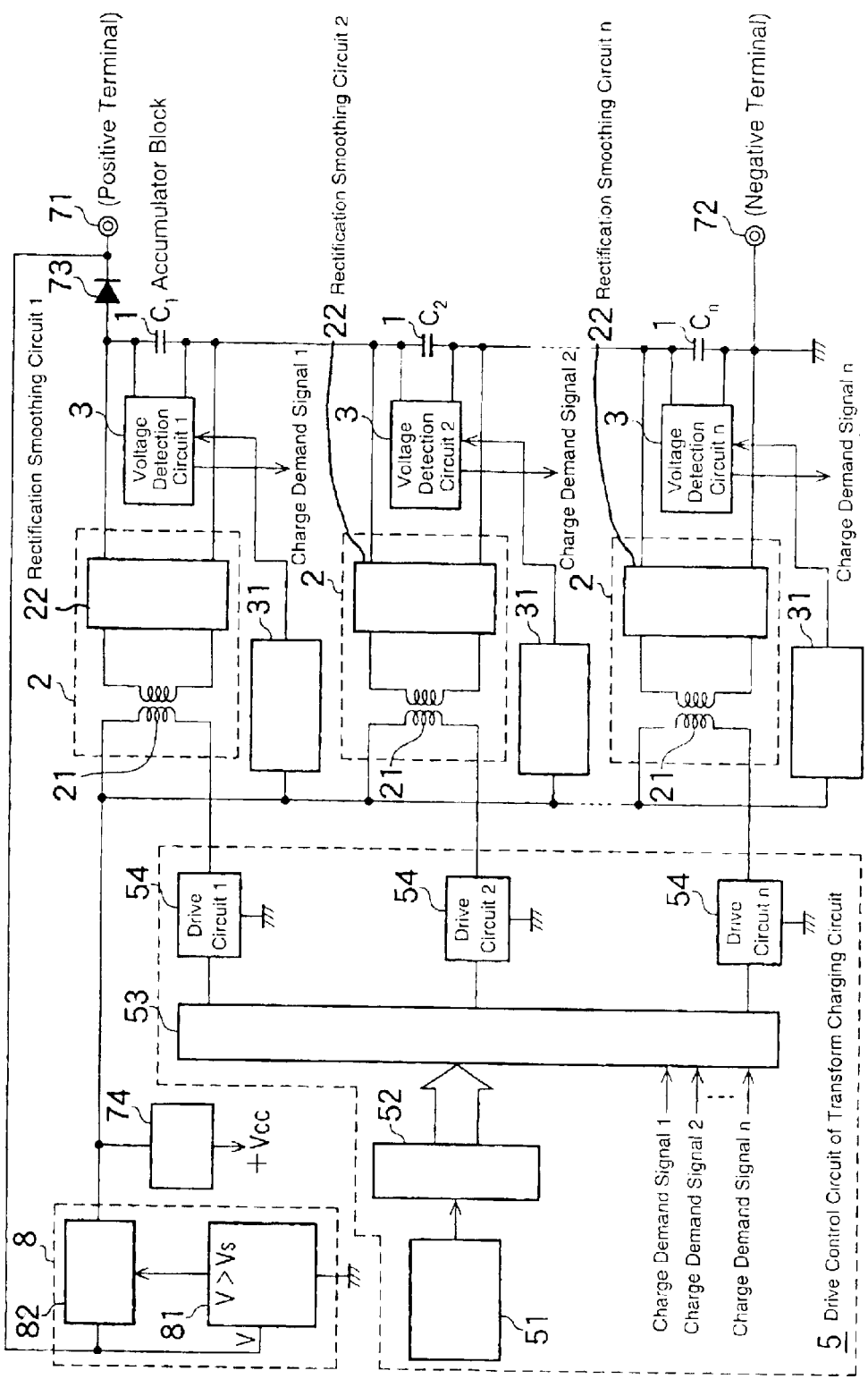
FIG. 1 is a circuit diagram of the accumulator power supply unit of this invention.
Figure 2:
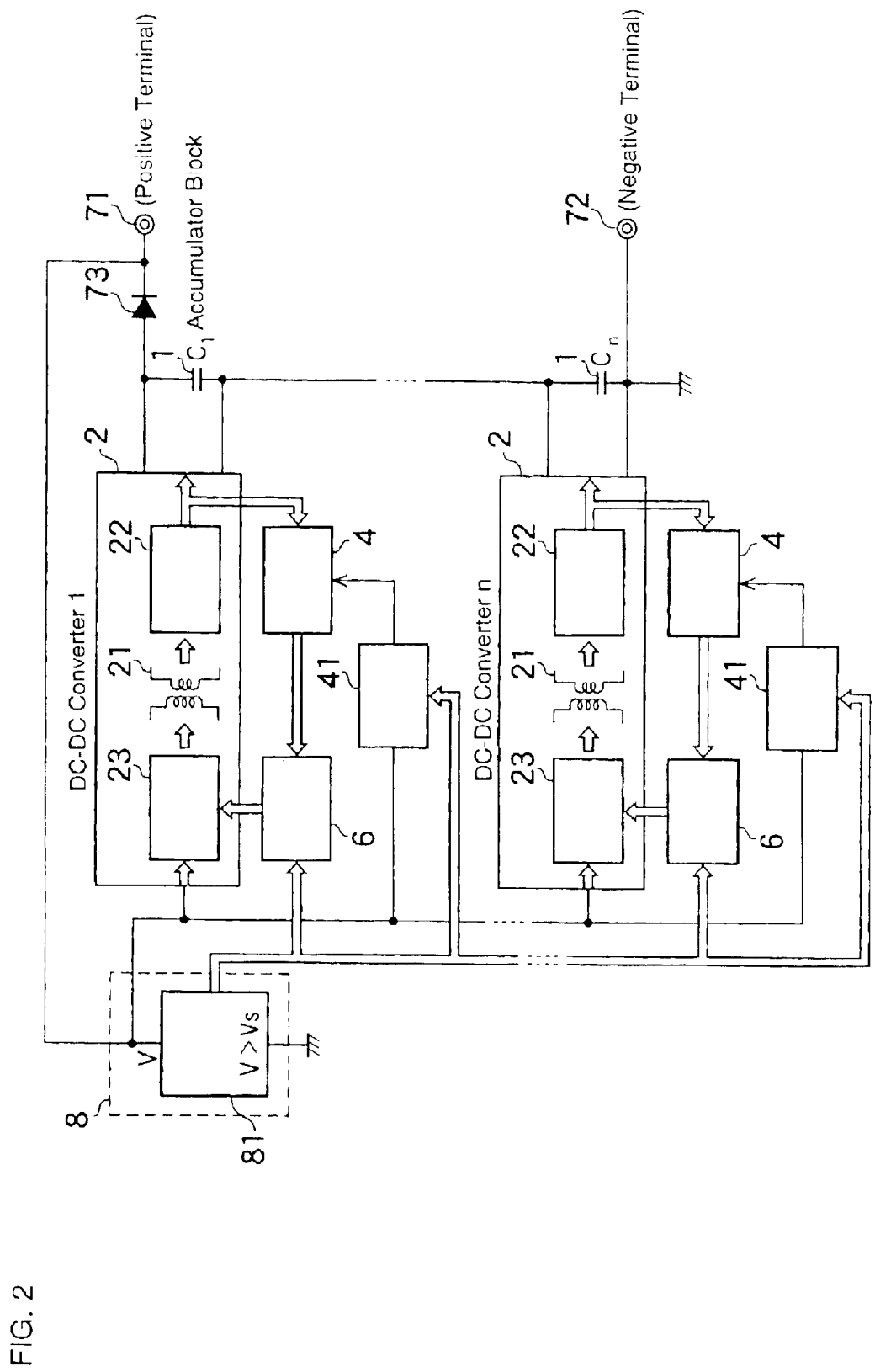
FIG. 2 is another circuit diagram of an alternate accumulator power supply unit of this invention.

An accumulator power supply unit conducts charging plural accumulator blocks 1 in a series or series-parallel connection independently, which sets charging electric current, charging voltage, and charging control method suitable for the respective accumulator block 1 and also avoids overcharging to the respective accumulator block 1. The accumulator power supply unit, for example as shown in FIGS. 1 and 2, charges and controls charging the respective accumulator block 1 independently while connecting plural accumulator blocks 1 (C1, . . . , Cn) in series and connecting the respective accumulator block 1 to a transform charging circuit 2 and supplies DC power to an object such as an electrical part which is connected outside of the accumulator power supply unit.

If the accumulator power supply unit is employed in a motor vehicle, two ends (positive terminal 71 and negative terminal 72) of plural accumulator blocks 1 connected in series are connected to an electric system such as a vehicle starter and a dynamo rectification circuit via a backflow prevention circuit 73, thereby supplying DC power to the starter and electric parts. Also, the DC power is supplied to the accumulator power supply unit from a power supply such as a dynamo. Here, output terminals 71, 72 of the accumulator power supply unit are also functioning as input terminals 71, 72.

The accumulator block 1 is a module having a single accumulator element or plural accumulator elements connected in parallel, wherein the element conducts both charging and discharging an electric double layer capacitor and a secondary battery. The accumulator element may be any element that is capable of charging and discharging. Major secondary batteries include an aqueous solution type battery such as nickel-metal-hydride secondary battery, nickel-cadmium secondary battery and non-aqueous solution type secondary battery such as lithium ion secondary battery, lithium metal secondary battery, and lithium ion polymer secondary battery. An electric double layer capacitor may employ both aqueous solution type and non-aqueous solution type electric double layer capacitors. As an accumulator element, non-aqueous solution type accumulator elements such as lithium ion secondary battery, lithium metal secondary battery, and lithium ion polymer secondary battery, non-aqueous solution type electric double layer capacitor may preferably be used due to its high energy density.

In the electrical double layer capacitor, ion conductive materials are arranged between a pair of electrode structures, and an electrical double layer is formed between a material with large surface area in the electrode structure and an electrolyte of the ion conductive material. A large surface area material is a powdery large surface area material which attracts many ions thereon. It is preferable to use activated carbon, which can be obtained from carbon material by steam activation method or by melted KOH activation process as the large surface material. For example, palmae shell type activated carbon types, phenol type activated carbon, petroleum coke type activated carbon, and polyacene may be used as activated carbon. These materials may be used alone or in a combination of two types or more. In order to increase electrostatic capacity, phenol type activated carbon, petroleum cokes type activated carbon, and polyacene are preferable among those materials.

Accumulator elements other than the electric double layer capacitor include an aqueous solution type battery such as nickel-metal-hydride secondary battery, nickel-cadmium secondary battery and non-aqueous solution type battery such as lithium ion secondary battery, lithium metal secondary battery, and lithium ion polymer secondary battery.

Especially, a non-aqueous solution type electrolyte secondary battery (lithium ion secondary battery) using electric materials that could dope and dope out lithium ion, i.e., carbon quality materials such as cokes and calcined organic materials as a negative electrode, is superior in charging and discharging cycle to and more preferable than a lithium secondary battery using metallic lithium and lithium alloy as a negative electrode. The lithium ion secondary battery described above, for example, is structured in that a positive electrode of lithium-cobalt composite oxide (LiCoO2) faces a negative electrode of carbon quality materials such as cokes and calcined organic materials positioning a pair of separators therebetween. The electrode may be wound in a spiral manner or laminated in layers. The non-aqueous solution type electrolyte is used between the electrodes. Then, the secondary battery needs to be charged prior to its initial use.

Further, a polymer battery having macromolecular compounds mixed in an electrolyte or electrode of the above-lithium ion secondary battery may preferably be used. The above-type of lithium ion polymer secondary battery has an advantage in that it may be formed thinner and lighter because of the characteristic of a film cladding used thereon. Further, it does not have any leakage problem and maintains safety even if some external pressure is applied on the battery corrupting inside and an edged object sticks into the battery causing short-circuit. Therefore, it is suitable for the accumulation block of this invention.

The accumulator block 1 is formed in combination of these accumulator elements. A capacitor only or secondary battery only may be used for the accumulator elements of the accumulator blocks 1 (C1, . . . , Cn) in series or series-parallel connection. Alternatively, a capacitor may be used for the accumulator elements of the accumulator blocks 1 (for example, C1) and a secondary battery may be used for the accumulator elements of other accumulator block 1 (Cn), and the accumulator blocks 1 (C1, . . . , Cn) may be connected in series or in series-parallel. In this case, both an excellent power density and large current discharge characteristic of the electric double layer capacitor and an excellent energy density of the secondary battery may be catabolized.

A transform charging circuit 2 may charge the accumulator block 1 using a transformer 21. The transformers 21 electrically separate other transform charging circuits 2 and other accumulator blocks 1. The transform charging circuit 2 charges the respective accumulator block 1 independently among plural accumulator blocks 1 connected each other without affecting or being affected by the charge of other accumulator blocks 1.

The transform charging circuit 2 as shown in FIG. 1 uses the transformer 21 and a rectification smoothing circuit 22 wherein the rectification smoothing circuit 22 is connected at the secondary side of the transformer 21. Alternating current (A.C.) such as pulse is input in the primary side of the transformer 21 to convert the voltage. The rectification smoothing circuit 22 may conduct rectification-smoothing of A.C. at the secondary side of the transformer 21 to generate power for charging the accumulator block 1. As shown in FIG. 2, a DC—DC converter may be used for the transform charging circuit 2. DC—DC converter for example comprises a switching circuit 23, the transformer 21, and the rectification smoothing circuit 22, wherein voltage direct current (VDC) is converted into an alternating pulse voltage by the switching circuit 23; and the pulse voltage is transformed by the transformer 21 and is converted into direct current (DC) by the rectification smoothing circuit 22 at the secondary side of the transformer.

The transform charging circuit 2 is controlled based on the state of charge of the accumulator block 1. Accordingly, a control circuit of the transform charging circuit 2 comprises a circuit detecting the state of charge of the accumulator block 1 and a drive control circuit 5 of the transform charging circuit.

A circuit detecting the state of charge of the accumulator block 1 outputs charge demand signal when the charge of the accumulator block 1 becomes necessary. A voltage detecting circuit 3 as shown in FIG. 1 may be used as a circuit detecting the state of charge of the accumulator block 1, wherein the voltage of the accumulator block 1 is detected thereat and, if the voltage is lower than a predetermined value, the charge demand signal is output until the voltage reaches to the predetermined value.

An output detection circuit 4 may be used for a circuit detecting the state of charge of the accumulator block 1 as shown in FIG. 2, which outputs volt-current control signal to control the charging voltage and the charging current based on the state of charging voltage of the accumulator block 1.

Both voltage detection circuit and current detection circuit for example may be used for the output detection circuit 4, wherein the voltage of the accumulator block 1 is detected and volt-current control signals is output so that the accumulator block 1 is charged at constant-current until the voltage reaches to the predetermined value and maintains the voltage when the voltage is lower than the predetermined value.

Further, power supply circuits 31, 41 to drive the voltage detection circuit and the current detection circuit used to detect the state of charge of the accumulator block 1, for example, are positioned in parallel to the respective transform charging circuit 2 following the example in FIGS. 1–2.

Discrete insulating power supply circuits 31, 41 causing an electrical discrete insulation are used at the primary or voltage input side and the secondary or voltage output side of this power supply circuit. For example, a transformer, condenser, and a DC—DC converter may be used for the discrete insulation.

The primary side of the discrete insulating power supply circuits 31, 41 is connected to the primary side of the transform charging circuit 2 while the secondary side of the discrete insulating power supply circuits 31, 41 is used as a power supply for operation of the voltage detection circuit 3 and the output detection circuit 4.

Also, power supply circuits 31, 41 for operation of the voltage detection circuit 3 and the output detection circuit 4 may suspend the operation by means of signals for suspending the charge of the accumulator block 1 generated in the input voltage detection circuit 81, i.e., signals that suspends the operation of the transform charging circuit 2 when the voltage V of the input terminal detected at the input voltage detection circuit 81 is lower than a predetermined input voltage Vs.

The discrete insulation power supply circuits 31, 41 for the operation of the voltage detection circuit 3 and the output detection circuit 4 are positioned independently from the transform charging circuit 2, and the respective transform charging circuit 2 is stably controlled and operated while the accumulation block 1 is not being charged, i.e., until the charging voltage of the accumulation block 1 reaches to the predetermined value from zero.

The drive control circuit 5 of the transform charging circuit receives the charge demand signal to conduct the drive control of the transform charging circuit 2 and for example as in FIG. 1, may use a timing signal oscillator circuit (OSC) 51, a signal time division circuit 52, a gate circuit 53, and a drive circuit or driver 54. The drive control circuit 5 of the transform charging circuit in FIG. 1 is to charge the respective accumulation block 1 individually in time division. The timing signal OSC 51 outputs pulse signals. The signal time division circuit 52 time-divides the pulse signals and generates drive signals to charge the respective accumulator block 1 using the transformer 21. Signals time-divided may be a single or plural pulses. If the accumulator block 1 needs to be charged, the gate circuit 53 outputs the time divided signals while, if the accumulator block 1 does not need to be charged or when the voltage reaches to the predetermined value, the gate circuit 53 is controlled not to output the time divided signals. The gate circuit 53 determines AND between the time divided signals and the charge demand signals to derive the drive circuit or driver 54 for drive control of the transform charging circuit 2.

The drive control circuit 5 of the transform charging circuit, for example the transform charging circuit 2 as shown in FIG. 2, uses the DC—DC converter, and a control circuit 6 turning on-off the switching circuit 23 of the DC—DC converter. When the control circuit 6 receives volt-current control signals from the output detection circuit 4, the switching circuit 23 is driven and controlled. For the switching circuit 23, VDC is converted into AC pulse to be added in the transformer 21.

Also, if the accumulator block 1 is being sufficiently charged with the predetermined voltage value, the control switch 6 controls the frequency or pulse width of the switching to control the switching circuit 23 for the maintenance of the predetermined voltage value.

The input voltage circuit 8 is to supply DC, output from the power supply circuit such as a dynamo, to the transform charging circuit 2. In FIG. 1, the input voltage circuit 8 converts the voltage of the input terminal of the accumulator power source unit by the DC—DC converter 82 to be supplied to the transform charging circuit 2. In FIG. 2, the voltage of the input terminal is directly supplied to the transform charging circuit 2. Further, the output voltage of the DC—DC converter may be used as the input voltage of an IC power source 74 generating the voltage to be supplied to the drive control circuit 5 of the transform charging circuit.

In the input voltage circuit 8 of FIG. 1, the input voltage detection circuit 81 detecting the input voltage V is connected to the DC—DC converter 82. If the detected voltage V of the input terminal is smaller than the predetermined value Vs, the input voltage detection circuit 81 suspends the driving of the DC—DC converter 82 in order to limit the consumption of the accumulation in the accumulation block 1.

The input voltage circuit 81 of FIG. 2 controls the switching circuit 23 via the control circuit 6 and controls the charge of the accumulation block 1. That is, if the voltage V of the input terminals 71, 72 detected at the input voltage detection circuit 81 of FIG. 2 is smaller than the predetermined value Vs, a signal is output to the control circuit 6 and the control circuit 6 suspends driving of the switching circuit 23.

A method for controlling the charge of the accumulator power source unit is explained next.

In the accumulator power source unit of FIG. 1, the timing signal OSC 51 outputs pulse signals. The pulse signal is time divided into one pulse or plural pulses per the respective accumulator block 1 at the timing signal OSC 52 When the charge demand signal is output from the voltage detection circuit 3 in the gate circuit 53, the time divided signal is output to the drive circuit 54 as drive signals passing through the gate circuit 53 only if the condition of the AND between the time divided signal and the charge demand signal is satisfied to open the gate circuit 53. That is, the drive signal is sequentially output through the gate circuit 53 into the drive circuit 54 of the accumulator block 1 with charge demand signal. The drive circuit 54 opens and closes the circuit to form pulse current from the direct-current voltage from DC—DC converter 82 through a primary coil of the transformer 21 when the drive circuit 54 receives the drive signals from the gate circuit 53. If the pulse current flows into the primary coil, the AC is generated at the secondary coil of the transformer 21, and the AC is converted into DC by the rectification smoothing circuit 22 to charge the accumulator block 1.

If the accumulator block 1 is sufficiently charged and the charging voltage reaches to the predetermined value, no charge demand signal is output from the voltage detection circuit 3. In that case, the time divided signals provided for the accumulator block 1 being sufficiently charged do not pass through the gate circuit 53, thereby suspends charging the sufficiently charged accumulator block 1 to prevent the overcharging. Thus the voltage of the accumulator block 1 does not increase beyond the predetermined voltage.

Also, if the input voltage is lower than the predetermined voltage value Vs, the input voltage detection circuit 81 suspends the DC—DC converter 82 to suspend the charging of all accumulator blocks 1. Accordingly, unnecessary consumption of the accumulation of the accumulator block 1 is prevented.

In the accumulator power source unit of FIG. 2, the output detection circuit 4 of the respective accumulator block 1 detects the voltage of the accumulator block 1 and outputs the volt-ampere control signals if the detected voltage is lower the predetermined value. The control circuit 6 receives volt-current control signals and drive the switching circuit 23 of the DC—DC converter 2. The switching circuit 23 switches the DC of the input terminal of the DC—DC converter 2 converting into AC such as pulse to be output to the primary coil of the transformer 21. AC generated at the secondary coil of the transformer 21 is rectification-smoothed by the rectification smoothing circuit 22 to charge the accumulator block 1 that needs to be charged. If the charging voltage of the accumulator block 1 is lower than the predetermined value, the accumulator block 1 is charged until the voltage reaches to the predetermined value. If the voltage reaches to the predetermined value, the volt-current control signals is not output and the charging current flowing into the accumulator block 1 is reduced to maintain the voltage. Accordingly, overcharging of the accumulator block 1, i.e., increase of the voltage above the predetermined value, is prevented.

Also, if the input voltage is lower than the predetermined voltage value Vs, the input voltage detection circuit 81 outputs to all control circuits 6 to suspend the driving of the switching circuit 23 and the charging of all accumulator blocks 1. Accordingly, unnecessary consumption of the accumulation of the accumulator block 1 is prevented.

This invention as described above, renders the following advantages: An accumulator power supply unit technology of this invention does not require an electric current bypass circuit and cause a problem of unnecessary power loss when charging an accumulator block such as electric double layer capacitors and secondary batteries in series or serial-parallel connection. Further, the accumulator power supply unit technology of this invention equalizes the voltage of the respective accumulator block regardless of the different increasing speed of the charging voltage due to different characteristic of the respective accumulator block.

Further, the accumulator power supply unit technology of this invention may charge the respective accumulator block by connecting the accumulator block of the electric double layer capacitor and the accumulator block of a secondary battery in series or in series-parallel manner and making a combination of the electrical double layer capacitor and secondary battery.

Also, the accumulator power supply unit technology efficiently charges an accumulator block such as electric double layer capacitors and secondary batteries in series or serial-parallel connection.

Further, the accumulator power supply unit technology of this invention charges the accumulator block in need of charging only without affecting the charge of other accumulator blocks when charging an accumulator block such as electric double layer capacitors and secondary batteries in series or serial-parallel connection.

While the foregoing invention has shown and described with reference to a number of preferred embodiments, it will be understood by those of skill in the art that various changes in form and detail may be made therein without departing from the spirit and scope of the instant invention.

What we claim is:

1. An accumulator power supply unit comprising:

plural accumulator blocks in at least one of a series connection and a series-parallel connection;

plural transform charging circuits connected in parallel to the respective accumulator block, driving circuits driving the respective transform charging circuit in time division;

a timing signal generating circuit sending a command for timing of a charge;

a signal time division circuit transmitting a signal for timing of the charge to the accumulator blocks based on the timing signal;

voltage detection circuits detecting the voltage of the respective accumulator block to be compared with a standard voltage for outputting a signal demanding the charge; and a gate circuit determining AND between time division charge timing signal and the charge demand signal from the voltage detection circuits, allowing only necessary time division charge timing signal to pass through, and outputting the drive signal to the drive circuit, wherein said accumulator power supply unit is chargeable and rechargeable by means of the respective accumulator block using said transformer circuits, and the respective accumulator block is charged in time division by the respective transform charging circuit.

2. The accumulator power supply unit as claimed in claim 1, wherein the respective transform charging circuit comprises a switching circuit outputting switching wave form into the transformer, an output detection circuit detecting the voltage and the charging current of the respective accumulator block, and a control circuit controlling the switching circuit by a volt-current control signal of the output detection circuit, wherein the control circuit controls the switching circuit based on a voltage and charging current detected at the output detecting circuit so as to conduct charging control of the accumulator block.

3. The accumulator power supply unit as claimed in claim 1, wherein the accumulator power supply unit further comprises an input voltage detection circuit detecting terminal voltage of the accumulator power supply unit and suspending operation of the transform charging circuits to inhibit the charging of the respective accumulator block if the terminal voltage is lower than a predetermined voltage value.

4. The accumulator power supply unit as claimed in claim 1, wherein the transform charging circuit comprises a transformer and a rectification smoothing circuit, and the accumulator block is charged by rectification-smoothing the electric current generated at the transformer.

* * * * *